(12) United States Patent
Fyke et al.

(10) Patent No.: US 9,013,435 B2
(45) Date of Patent: *Apr. 21, 2015

(54) PORTABLE ELECTRONIC DEVICE INCLUDING TOUCH-SENSITIVE DISPLAY AND METHOD OF CONTROLLING SAME

(71) Applicant: Blackberry Limited, Waterloo (CA)

(72) Inventors: Steven Henry Fyke, Waterloo (CA); Jason Tyler Griffin, Kitchener (CA); Kevin Howard Orr, Elmira (CA); Laura Mahan, Kanata (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,202

(22) Filed: Nov. 26, 2013

(65) Prior Publication Data

US 2014/0078092 A1 Mar. 20, 2014

Related U.S. Application Data

(63) Continuation of application No. 13/027,061, filed on Feb. 14, 2011, now Pat. No. 8,624,858.

(51) Int. Cl.
*G06F 3/041* (2006.01)
*G06F 3/0488* (2013.01)

(52) U.S. Cl.
CPC .... *G06F 3/0416* (2013.01); *G06F 2203/04808* (2013.01); *G06F 3/04883* (2013.01)

(58) Field of Classification Search
USPC .............. 345/156–179; 178/18.01–18.09; 715/711, 754
See application file for complete search history.

(56) References Cited

U.S. PATENT DOCUMENTS

| | | | |
|---|---|---|---|
| 4,914,624 A | 4/1990 | Dunthorn | |
| 2005/0024341 A1 | 2/2005 | Gillespie et al. | |
| 2006/0026521 A1 | 2/2006 | Hotelling et al. | |
| 2007/0247435 A1 | 10/2007 | Benko et al. | |
| 2007/0257891 A1* | 11/2007 | Esenther et al. | 345/173 |
| 2008/0231610 A1 | 9/2008 | Hotelling et al. | |
| 2008/0309626 A1 | 12/2008 | Westerman et al. | |
| 2010/0214218 A1 | 8/2010 | Vaisanen et al. | |
| 2011/0010668 A1 | 1/2011 | Feldstein et al. | |
| 2011/0018806 A1* | 1/2011 | Yano | 345/163 |

FOREIGN PATENT DOCUMENTS

EP 1852774 A2 11/2007

OTHER PUBLICATIONS

Examiners Report dated Nov. 15, 2013, issued from the corresponding Canadian patent application No. 2,762,726.

(Continued)

*Primary Examiner* — Premal Patel
(74) *Attorney, Agent, or Firm* — Lesley M. Morrison; Borden Ladner Gervais LLP

(57) ABSTRACT

A method includes: detecting a first touch at a first location on a touch-sensitive display; detecting a second touch at a second location on the touch-sensitive display; and displaying a navigation indicator on the touch-sensitive display in response to detecting the second touch while first touch contact is maintained.

12 Claims, 7 Drawing Sheets

(56) References Cited

OTHER PUBLICATIONS

Benko Hrvoje et al.: "Precise Selection Techniques for Multi-Touch Screens", Conference Proceedings / CHI 2006, Conference on Human Factors in Computing Systems: Montréal, Quebec, Canada, Apr. 22-27, 2006; [CHI Conference Proceedings. Human Factors in Computing Systems] Association for Computing Machinery (ACM) Press, NE, Apr. 22, 2006, pp. 1263-1272, XP002599390, ISBN: 978-1-59593-178-8.

Extended European Search Report dated Jul. 21, 2011, issued from the corresponding EP patent application No. 11154432.6.

Office Action dated Nov. 23, 2011, issued from the corresponding EP patent application No. 11154432.6.

* cited by examiner

PORTABLE ELECTRONIC DEVICE INCLUDING TOUCH-SENSITIVE DISPLAY AND METHOD OF CONTROLLING SAME

FIELD OF TECHNOLOGY

The present disclosure relates to portable electronic devices including touch-sensitive displays and the control of such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached figures, wherein.

DETAILED DESCRIPTION

Figure 1:
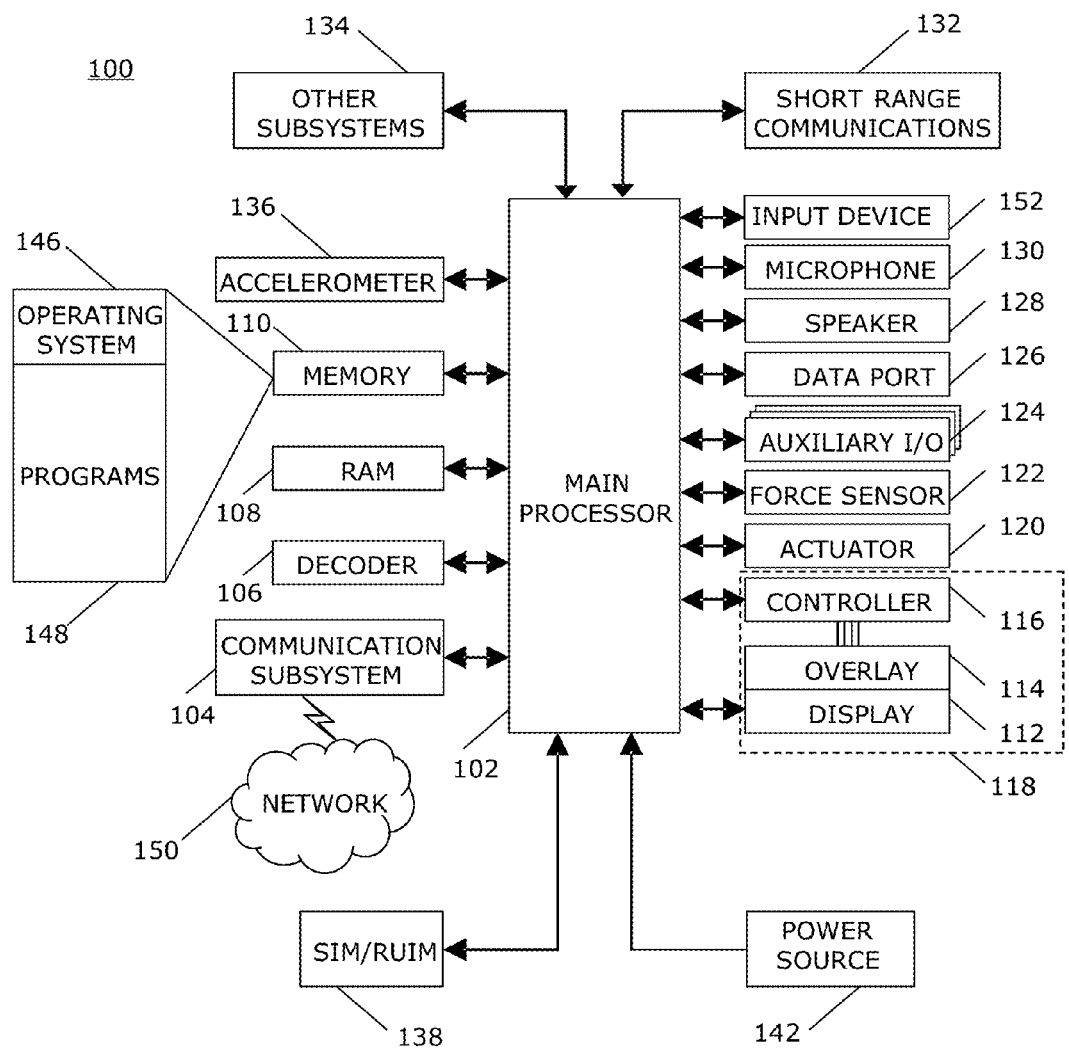
FIG. 1 is a simplified block diagram of one example of a portable electronic device in accordance with the present disclosure.

The following describes an apparatus for and method of controlling an electronic device including detecting a first touch at a first location on a touch-sensitive display; detecting a second touch at a second location on the touch-sensitive display; and displaying a navigation indicator on the touch-sensitive display in response to detecting the second touch while first touch contact is maintained.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators (not shown) to provide tactile feedback and one or more force sensors (not shown) to detect a force imparted on the touch-sensitive display 118. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The direction may be referenced with respect to the touch-sensitive display 118, the orientation of the information displayed on the touch-sensitive display 118, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin point and the finishing point of the swipe may be utilized to determine the magnitude or distance of the swipe. The duration of the swipe may be determined from the origin point and finishing point of the swipe in time. The processor 102 receives data from the controller 116 to determine the direction, magnitude, and duration of the swipe. The gesture may be tracked and a plurality of sub-vectors determined for each gesture. The final sub-vector may be utilized to determine a distance and duration of a final portion of the gesture. The processor 102 receives data from the controller 116 to determine the speed of the swipe based on the distance and duration of the final portion of the gesture.

Figure 2:
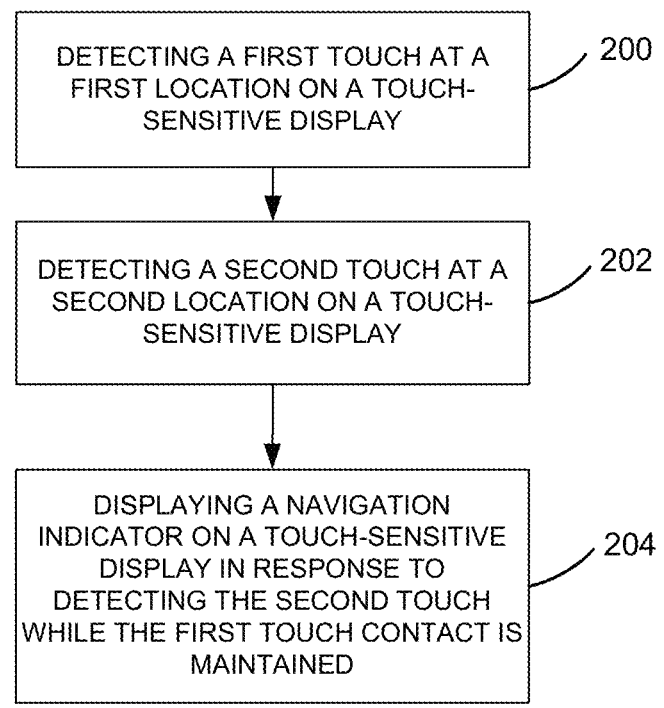
FIG. 2 is a flowchart illustrating an example of a method of controlling an electronic device in accordance with the present disclosure.

FIG. 2 is a flowchart illustrating an example of a method of controlling a portable electronic device 100. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

The method is carried out on a portable electronic device 100 having a touch-sensitive display 118 that receives touch input. The touch-sensitive display 118 may display icons that are selectable to launch applications, to navigate through folders and to modify device settings, for example. The touch-sensitive display 118 may further display re-sizable graphical elements, such as windows for displaying text and/or images associated with a software application. The touch-sensitive display 118 does not continuously display a navigation indicator, such as a pointer or a cursor, for example.

The method of FIG. 2 is directed to displaying a navigation indicator on the touch-sensitive display 118 of the portable electronic device 100 and includes detecting 200 a first touch at a first location on a touch-sensitive display 118, detecting 202 a second touch at a second location on the touch-sensitive display 118, and displaying 204 a navigation indicator on the touch-sensitive display 118 in response to detecting the second touch while first touch contact is maintained.

When displayed, the navigation indicator is spaced from the first touch and the second touch. Therefore, a view of selectable graphical elements on the touch-sensitive display 118 is not blocked by objects touching the touch-sensitive display 118, such as a user's fingers, for example, at the navigation indicator location. In one embodiment, the navigation indicator is displayed between the first touch location and the second touch location on the touch-sensitive display 118.

The method of FIG. 2 facilitates fine navigation, which is useful on a touch-sensitive display 118 including many different user-selectable graphical elements that are spaced close together.

Figure 3:
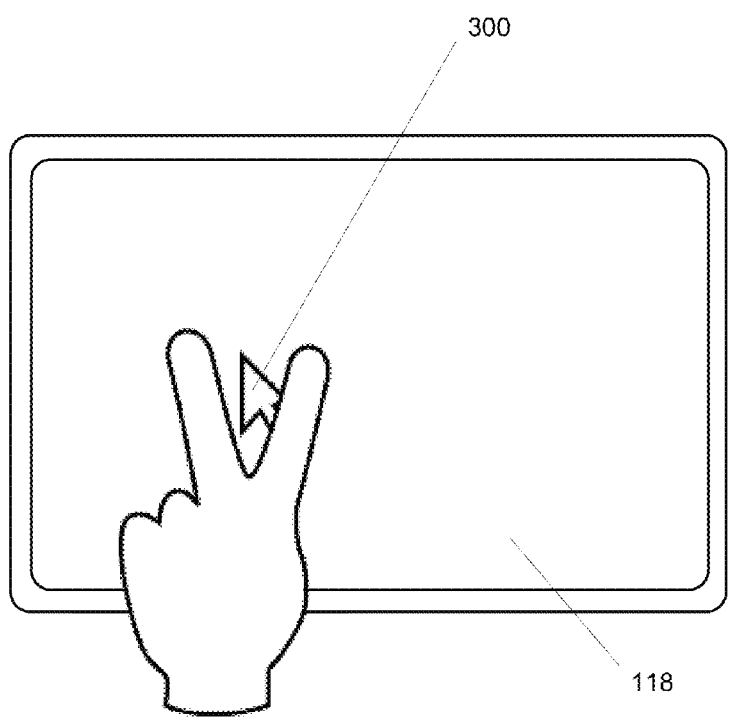
FIG. 3 illustrates an example of a portable electronic device receiving a first touch and a second touch on the touch-sensitive display thereof in accordance with the present disclosure.

Continued reference is made to FIG. 2 with additional reference to FIG. 3 to describe one example of a method for controlling a portable electronic device 100. In the present example, a user touches the touch-sensitive display 118 with two fingers, as shown. The processor 102 detects 200 a first touch at a first location and detects 202 a second touch at a second location. Navigation indicator 300 is then displayed 204 in response to detection 202 of the second touch while the first touch is maintained. The navigation indicator 300 is depicted as an arrow, however, the navigation indicator 300 may be any shape.

Figure 4:
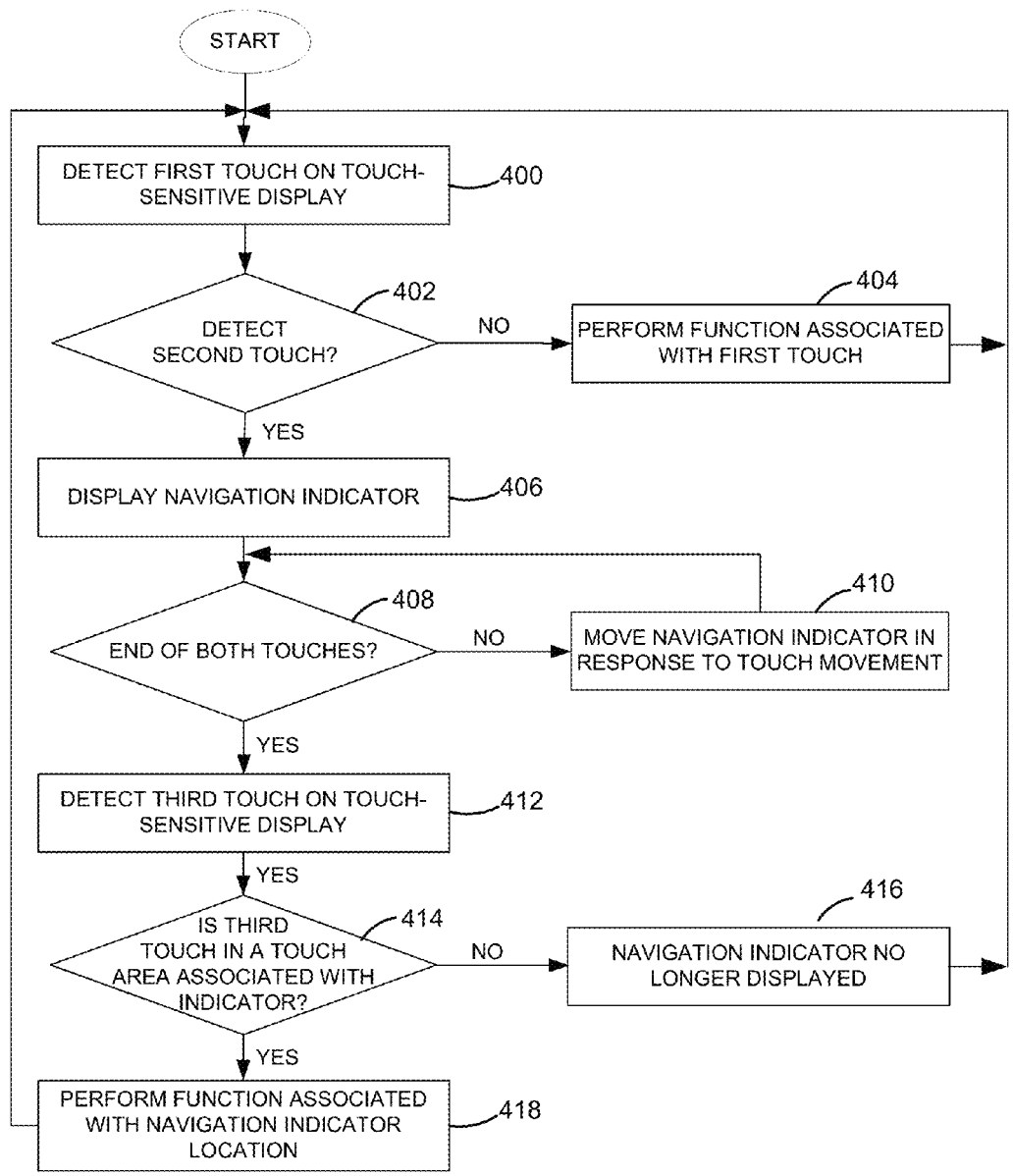
FIG. 4 is a flowchart illustrating another example of a method of controlling an electronic device in accordance with the present disclosure.

Once the navigation indicator 300 is displayed, different methods for moving the navigation indicator 300 on the touch-sensitive display 118 and making a selection are possible. One example method is shown in FIG. 4. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

When a first touch is detected 400 at a first location on the touch-sensitive display 118, the processor 102 awaits detection 402 of a second touch. If no second touch is detected 402 within a threshold time period following detection 400 of the first touch, the processor 102 performs a function that is associated with the first touch 404. The function may be any function that is available via touch selection on the touch-sensitive display 118 of the portable electronic device 100. The function may include, for example, launching an application, opening a folder, activating a window, and minimizing, maximizing or closing an active window.

When the second touch is detected 402 within the time period at a second location on the touch-sensitive display 118, a navigation indicator 300 is displayed 406 on the touch-sensitive display 118.

The threshold time period between the first touch and the second touch may be short in order to maintain responsiveness of the portable electronic device 100 to user selection. The time period may be zero seconds, when the first and second touches are detected at substantially the same time, or the time period may be between zero seconds and 0.25 seconds. Other time periods are possible. In general, the time period is selected to reduce a time lag between a single touch and the processor 102 performing the associated function while allowing sufficient time for detection of a two-finger touch.

Referring still to FIG. 4, when both the first and second touches end 408, the processor 102 awaits detection of a third touch on the touch-sensitive display 118. If the first and second touches continue, the navigation indicator moves 410 in response to movement of one or both touches. If the touches remain generally stationary, the navigation indicator maintains its position on the touch-sensitive display 118. When one of the first touch and second touch ends and the other is maintained, the processor 102 waits for the other touch to end. In one embodiment, after waiting for a threshold time period, the method may revert to having detected 400 a first touch and continue the method at 402.

When the third touch is detected 412, the processor 102 determines if the third touch is located in a touch area that is associated with the navigation indicator 414. If the third touch is in the touch area, the processor 102 performs a function that is associated with the navigation indicator location 418 and the navigation indicator is no longer displayed on the touch-sensitive display 118. If the third touch is not within the touch area, the navigation indicator is no longer displayed 416 and the method continues at 400. In one embodiment, if the third touch is not detected 412 within a threshold time period, the navigation indicator is no longer displayed.

The touch area is associated with the navigation indicator and may be generally centered at the navigation indicator. A touch is in the touch area when the entire contact area between the object touching the touch-sensitive display 118 and the touch-sensitive display 118 is in the touch area or when a portion of the contact area is in the touch area and a portion of the contact area is outside of the touch area. The size of the touch area may be determined for a particular device by considering the size of the display, the pixel density and the target demographic. In one embodiment, the size of the touch area is customizable by the user through a device setting option.

The touch area may be a circle, however, other shapes are possible including oval, square and triangular, for example. The shape of the touch area may further be different depending on where on the touch-sensitive display 118 the navigation indicator is located. For example, if the navigation indicator is near an edge of the touch-sensitive display 118, the touch area may be semi-circular in shape.

Figure 5:
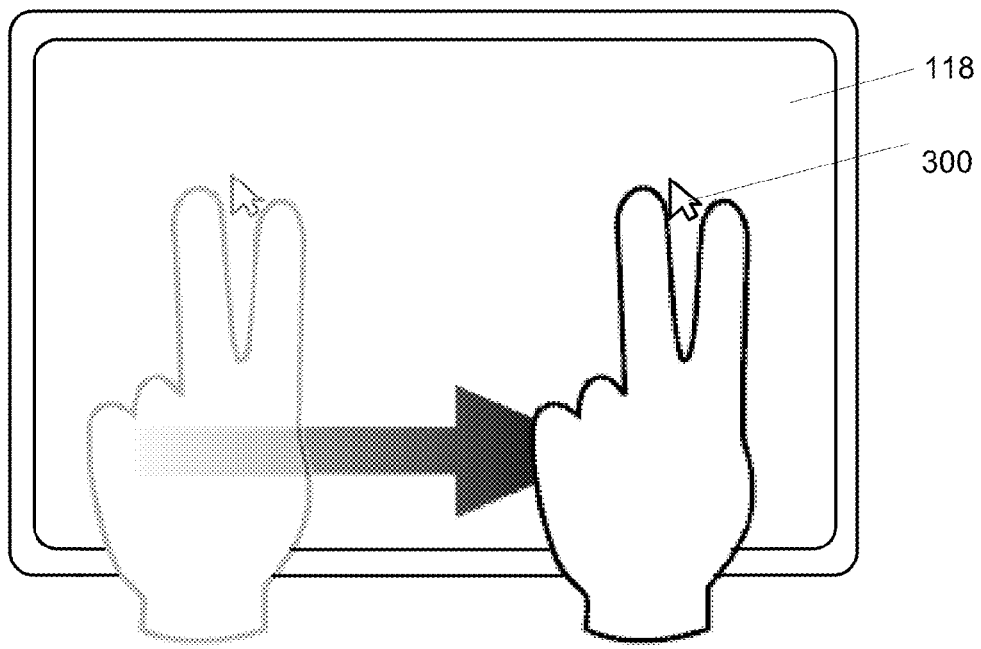
FIG. 5 to FIG. 7 illustrate examples of a portable electronic device receiving touches on the touch-sensitive display thereof in accordance with the present disclosure.
Figure 6:
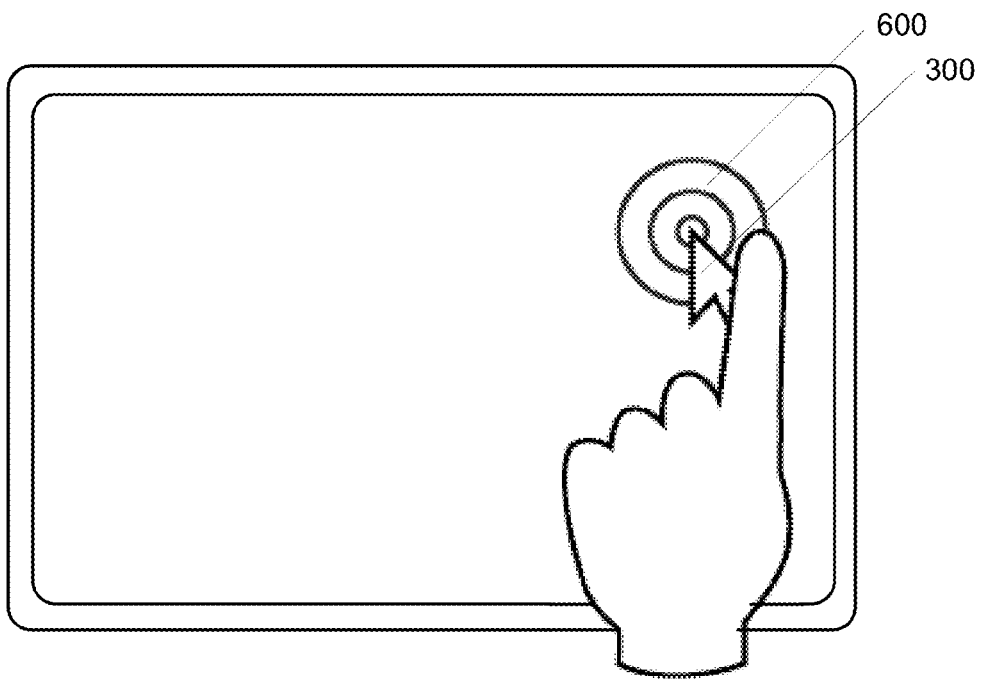
Figure 7:
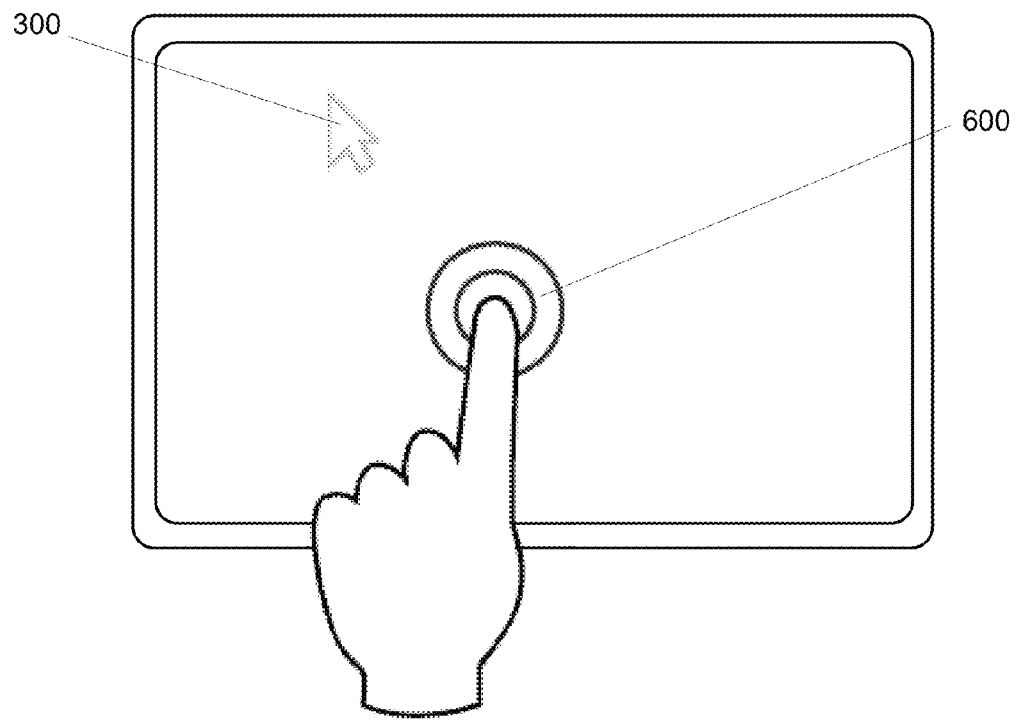

Continued reference is made to FIG. 4 with additional reference to FIGS. 5 to 7 to describe another example of a method for controlling a portable electronic device 100. In the present example, first and second touches are detected 400, 402 by the processor 102 and the navigation indicator 300 is displayed 404. Navigation indicator 300 then moves 410 in response to movement of the touches, as shown in FIG. 5. Once the navigation indicator 300 has moved to a desired location, both the first and second touches end 408 and a third touch is detected 412. If the third touch is located in a touch area 600, as shown in FIG. 6, the processor 102 performs a function that is associated with the navigation indicator location 418. If the third touch is not located in the touch area 600, as shown in FIG. 7, the navigation indicator 300 is no longer displayed.

Figure 8:
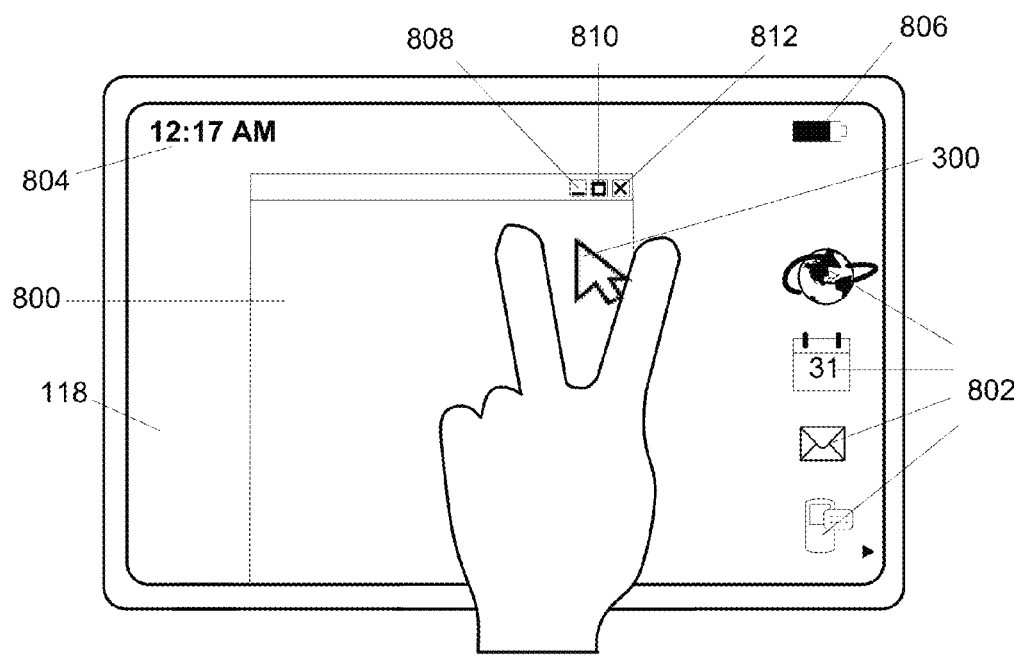
FIG. 8 to FIG. 10 illustrate further examples of a portable electronic device receiving touches on the touch-sensitive display thereof in accordance with the present disclosure.
Figure 9:
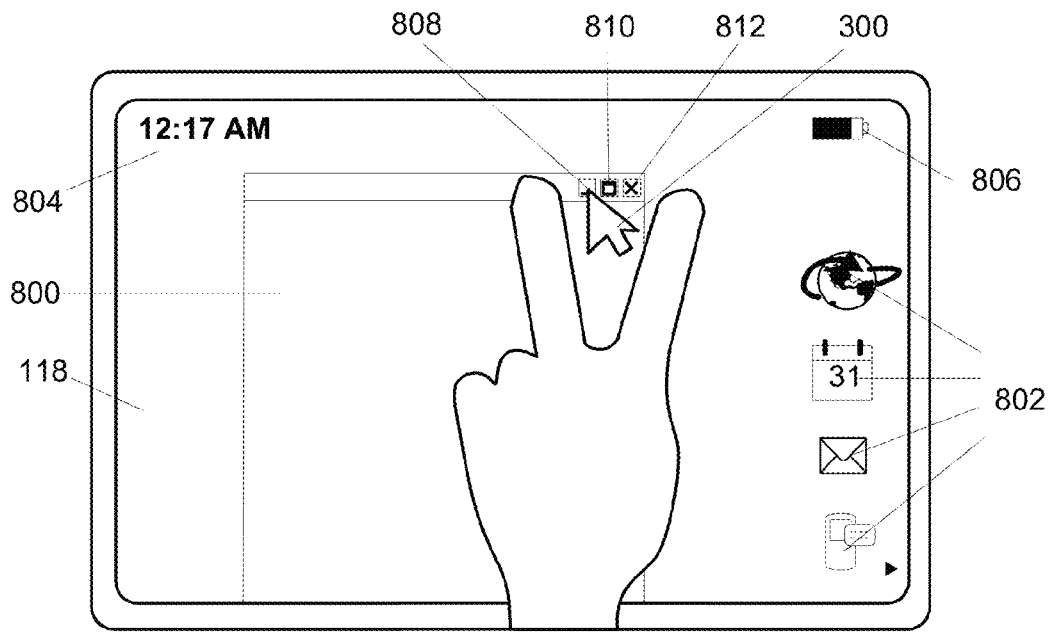
Figure 10:
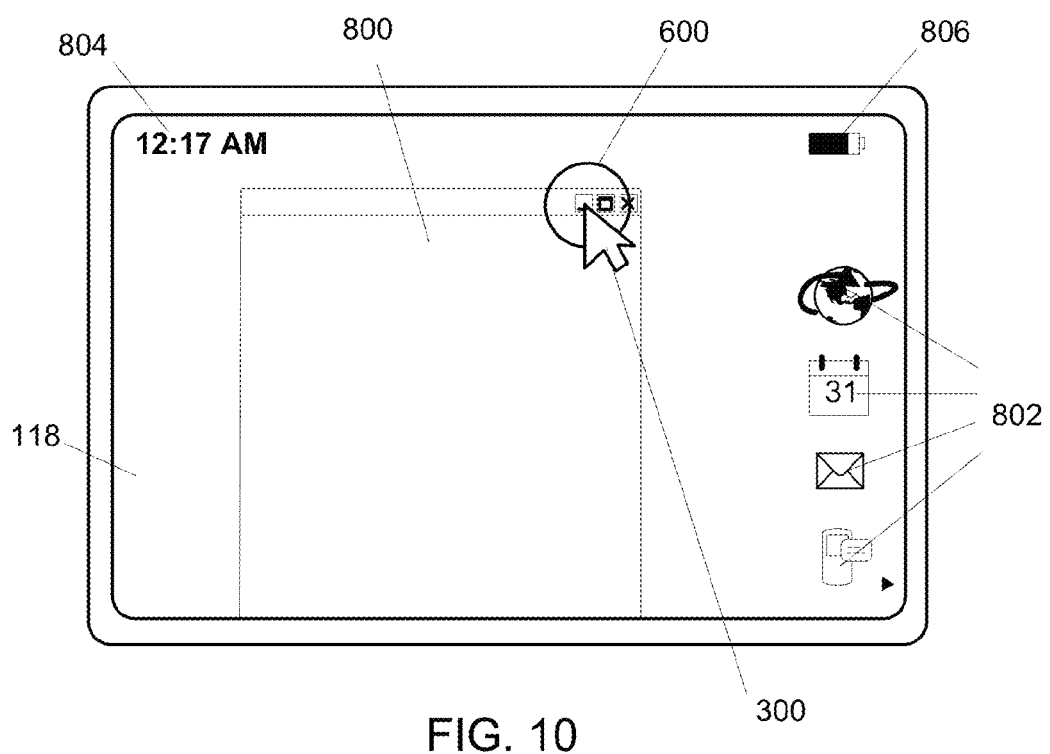

Continued reference is made to FIG. 4 with additional reference to FIGS. 8 to 10 to describe another example of a method of controlling the portable electronic device 100. In this example, a window 800, icons 802, which are user-selectable to launch applications, including browser, calendar, e-mail and text messaging applications, a clock 804 and a battery level icon 806, are displayed on the touch-sensitive display 118. At the top right corner of the window 800, user-selectable window control icons include: minimize window 808, maximize window 810 and close window 812. As shown, the window control icons are small relative to a typical user's finger size and closely spaced.

First and second touches are detected 400, 402 by the processor 102 and the navigation indicator 300 is displayed 406 on the touch-sensitive display 118. Referring also to FIG. 9, the navigation indicator 300 moves 410 in response to movement of one or both touches. In the present example, the navigation indicator 300 moves to a location where the navigation indicator 300 overlaps the minimize window icon 808 on the touch-sensitive display 118. Once the navigation indicator 300 has been located on an icon or other selectable element on the touch-sensitive display 118, both touches end and a third touch is detected 412. Referring to FIG. 10, when the third touch is detected within touch area 600, the function that is associated with the navigation indicator location is performed 418. In this example, the function performed is minimizing the window 800.

In general, fine navigation is useful for targeting small areas on a display, specific characters within text or pixels on a display. An advantage of using a navigation indicator to facilitate fine navigation is that the objects touching the touch-sensitive display, such as the user's fingers, for example, are spaced from the navigation indicator location during navigation. Therefore, the user's view of the user-selectable graphical elements on the touch-sensitive display is not blocked while the navigation indicator is moved to a desired location.

In an aspect of the disclosure there is provided a method for displaying a navigation indicator on the touch-sensitive display of a portable electronic device, the method including detecting a first touch at a first location on a touch-sensitive display, detecting a second touch at a second location on the touch-sensitive display, and displaying the navigation indicator on the touch-sensitive display in response to detecting the second touch while first touch contact is maintained.

In another aspect of the disclosure there is provided a portable electronic device including a touch-sensitive display configured to display information and a processor connected to the touch-sensitive display. The processor is configured to detect a first touch at a first location on the touch-sensitive display, detect a second touch at a second location on the touch-sensitive display, and display a navigation indicator in a graphical user interface in response to detection of the second touch while first touch contact is maintained.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    displaying a navigation indicator at a first indicator location on a touch-sensitive display in response to detecting a second touch at a second location on the touch-sensitive display while a first touch at a first location on the touch-sensitive display is maintained, the first indicator location being spaced from the first location and the second location;
    moving the navigation indicator to a second indicator location on the touch-sensitive display in response to detecting movement of at least one of the first touch and the second touch, the second indicator location being at a location on the touch-sensitive display that is different from the first indicator location; and
    detecting a third touch after the first touch and the second touch end and in response to detecting the third touch, performing a function associated with the second indicator location;
    wherein the third touch is in a touch area generally centered at the second indicator location.

2. The method of claim 1, wherein a contact area of the third touch is located entirely within the touch area.

3. The method of claim 1, comprising displaying the navigation indicator between the first location and the second location.

4. The method of claim 1, wherein the first touch and the second touch are simultaneous.

5. The method of claim 1, wherein the first touch and the second touch are spaced from the navigation indicator during movement of the navigation indicator.

6. The method of claim 1, wherein perform a function comprises at least one of: launching an application, opening a folder, activating a window, minimizing an active window, maximizing an active window and closing an active window.

7. A portable electronic device comprising:
    a touch-sensitive display configured to display information; and
    a processor connected to the touch-sensitive display to: detect a first touch at a first location on the touch-sensitive display; detect a second touch at a second location on the touch-sensitive display; display a navigation indicator at a first indicator location on the touch-sensitive display in response to detection of the second touch while first touch contact is maintained; move the navigation indicator to a second indicator location in response to detecting movement of at least one of the first touch and the second touch; detect a third touch after the first touch and the second touch end and when the third touch is in a touch area associated with an indicator location; and perform a function associated with the second indicator location;
    wherein the second indicator location is different from the first indicator location and the touch area is generally centered at the second indicator location.

8. The portable electronic device of claim 7, wherein the navigation indicator is displayed between the first location and the second location.

9. The portable electronic device of claim 7, wherein a contact area of the third touch is located entirely within the touch area.

10. The portable electronic device of claim 7, wherein the first touch and the second touch are spaced from the navigation indicator during movement of the navigation indicator.

11. The portable electronic device of claim 7, wherein the first touch and the second touch are simultaneous.

12. The portable electronic device of claim 7, wherein perform a function comprises at least one of: launching an application, opening a folder, activating a window, minimizing an active window, maximizing an active window and closing an active window.

* * * * *